Aug. 11, 1931.  N. B. M. O'BRIEN  1,818,739
ADVERTISING DEVICE
Filed Sept. 27, 1929  2 Sheets-Sheet 1
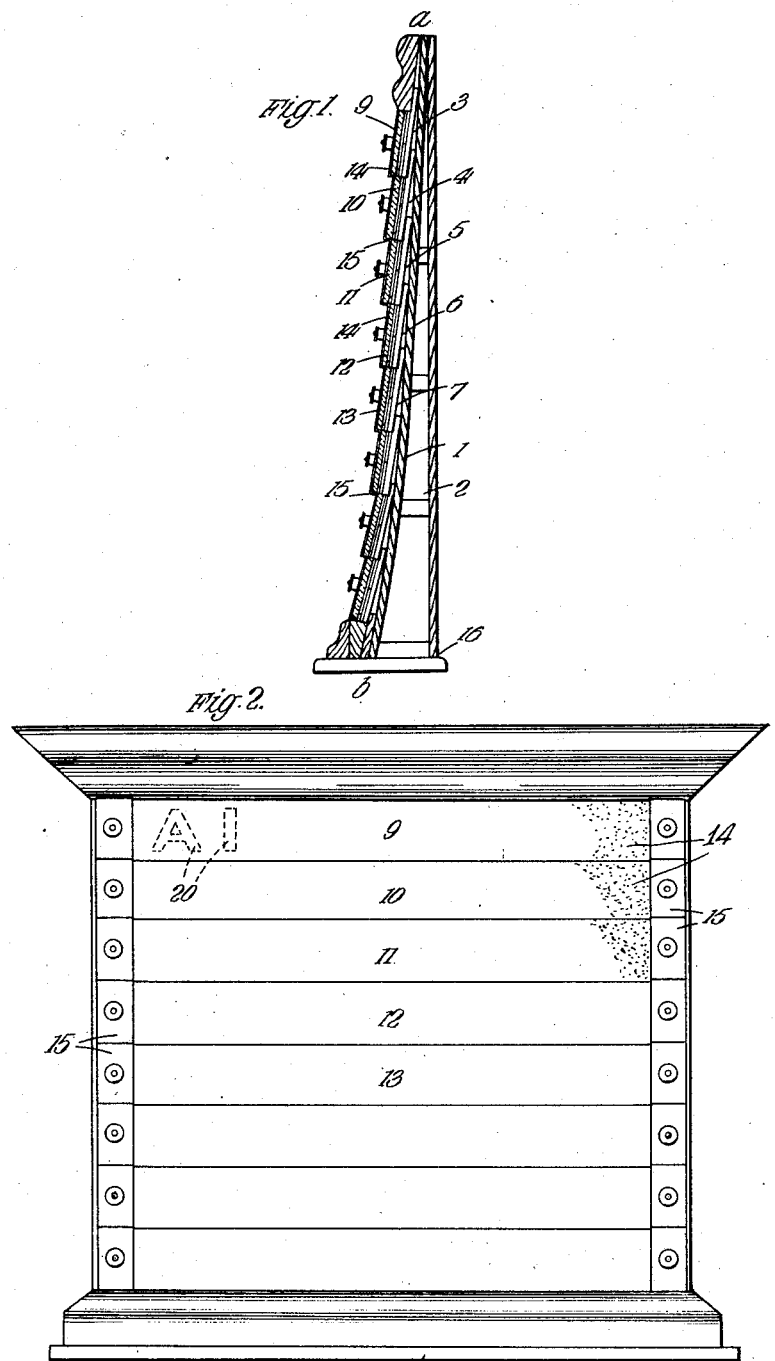
Norman Bernard Mackenzie O'Brien
INVENTOR;
his Attorney Aug. 11, 1931.  N. B. M. O'BRIEN  1,818,739
ADVERTISING DEVICE
Filed Sept. 27, 1929  2 Sheets-Sheet 2
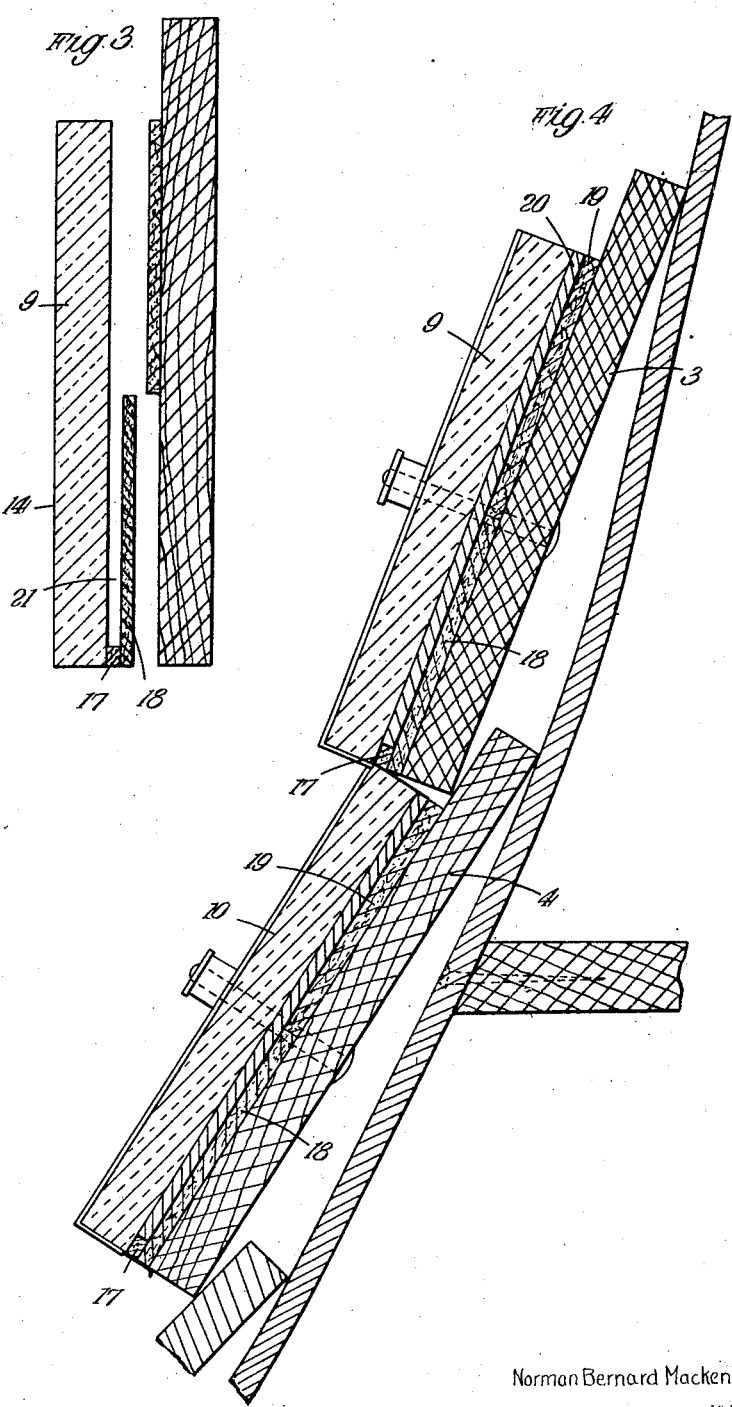
Norman Bernard Mackenzie O'Brien
INVENTOR:
By
his Attorney Patented Aug. 11, 1931

1,818,739

UNITED STATES PATENT OFFICE

NORMAN BERNARD MACKENZIE O'BRIEN, OF WIMBLEDON, LONDON, ENGLAND

ADVERTISING DEVICE

Application filed September 27, 1929, Serial No. 395,497, and in Great Britain October 5, 1928.

This invention of a new or improved advertising device provides a device wherein a horizontal or vertical line or column of letters, characters or figures, hereinafter called letters, are displayed to sight as attractive, brilliant, mirror-like objects of any desired colour.

According to this invention an advertising device has the advertising matter such as rows of words, letters, characters or figures distributed over elements or strips which are angularly disposed relatively to one another in either or both the vertical and horizontal planes, in such a way that all the elements or strips focus onto approximately the same point or line. A transparent diffusing surface or medium may be placed in front of each reflecting element or strip so that the light is diffused both before and after leaving the reflecting surface before it reaches the eye.

In order to make the invention clear a practical example of construction according to the invention will now be described with reference to the accompanying drawings, wherein:—

Figure 1 is a sectional side view of the device.

Figure 2 is a front view.

Figure 3 is a cross section to an enlarged scale showing details of construction.

Figure 4 is a cross section to an enlarged scale showing further details of construction.

The device is provided with a square or rectangular back 2 which, from top to bottom, increases in thickness from back to front on a gradual curve thereby forming a back of wedge-like shape. The front face 1 of the back 2 is provided with a number of horizontally disposed rows of flat surfaces 3, 4, 5, 6, 7, which are stepped in relation to one another as shown in Figures 1 and 4 so that the flat front faces are each inclined downwardly and forwardly somewhat resembling a rack having buttress teeth, the arrangement being such that if a line $a$, $b$, is drawn from the top to the bottom of the back and touching the front lower edges of each row 3, 4, 5, 6, 7, said line would be of arcuate formation, the curvature from point to point being such that all the flat surfaces focus onto the same horizontal line.

Each flat front face is covered with velvet, preferably black velvet or with flock card and on the said velvet or flock card are placed, but not stuck, the required words, letters, characters or figures, the same being cut from any bright mirror surfaced foil film, metal or card, the said 'letters' being either plain, stippled, ribbed, waved of otherwise treated.

Over each row of 'letters' is placed a strip of coloured glass, said strips of glass 9, 10, 11, 12 and 13 being all of one colour or varied in colour, and to prevent any outward reflections, the outer face 14 of each glass strip is stippled in known manner, the plain back face of said strips of glass 9, 10, 11, 12, 13 taking against and having intimate contact with the front faces of the 'letters'.

To hold the 'letters' in contact with the velvet and the glass strips in contact with the said 'letters' there are provided metal strips 15 on the two sides of the device. These strips rest on the outer ends of each glass strip and are tightened down thereonto by means of conveniently disposed screws and nuts. The strips may consist of a separate piece for each glass strip or they may be continuous on each side and stepped to correspond with the strips between the glass strips.

The back 2 is mounted upon a base 16 set at the angle required for correctly positioning the device. This base may be made adjustable in angle in any known manner. Alternatively the device may be provided with any convenient supporting means arranged for correctly positioning it.

It will be understood that the angle between adjacent strips will be less the greater the distance from the viewpoint to the device and in some instances, from this consideration, it may be unnecessary to step the strips back successively one from the other in order to maintain the total thickness of the device within reasonable dimensions. In such an arrangement, the bottom edge of one strip is coincident with the top edge of the next lower strip inclined to it and so on successively, so that as seen in side elevation, the front surfaces of the strips are all tangents to a continuous curve.

In a modification the rows of stepped flat faces may be pivotally mounted in any known way so that they may be adjusted to angles according to light conditions and suitable means may be provided to lock them in the adjusted positions.

Figures 3 and 4 show details, on an enlarged scale to facilitate the arrangement of the letters. To the lower edge of the strip of glass 9 is attached a strip of black flock or velvet faced card 17 of the same thickness as the 'letters' 20. A wider strip of black flock or velvet faced card 18 is attached at its lower end to the strip 17 so as to leave a space 21 into which the 'letters' 20 may be slipped. A corresponding strip 19 of black flock or velvet faced card is attached to the flat surface 3 so that its edge makes a close abutment against the edge of the card 18. Each strip of glass and its corresponding flat surface are similarly provided.

The 'letters' 20 are preferably stamped from cardboard with a mirror-like metal foil surface to catch the light.

The holding strips 15 may be replaced by a metal frame correspondingly shaped to bear against the face of each glass strip or it may be replaced by any form of metal clip.

The action of the device is as follows:— When the light from a source falls upon the various strips, usually from an overhead position, it is diffused and refracted before falling upon the mirror-like surface of the 'letters' 20. As the light passes out of the glass it is again diffused and refracted before passing to the eye. The diffusing surface obviates any "mirage" effect due to surface reflection at the surface of the glass. Each strip is set at such an angle that the light from all the strips is reflected simultaneously to some approved viewpoint. As a consequence of the diffusion and dispersion of the light when entering and leaving the glass, light reaches the eye from many directions and sources from every strip after reflection from the 'letters' 20 so that the latter appear to be brilliantly illuminated when viewed from many positions. If the surface of the 'letters' 20 is stippled or the like, the light is also diffused or dispersed at the surface of the reflector with the result that the 'letters' appear to be illuminated over a still wider range.

In a further modification each horizontal row of 'letters' consists of a series of short strips set at an angle with each other so as to focus onto approximately the same point in a similar manner to that previously described in the vertical direction. Such short strips may either abut against each other or they may be stepped relatively to the central strip so as to reduce the thickness of the back.

I claim:—
1. A reflector advertising device for advertising matter arranged in rows of words, letters, characters or figures, comprising a plurality of strips angularly disposed relatively to one another and in planes which bring the vision points of all the strips to a common focus, the upper side of each of the said strips being stepped backwards from the lower side of the next adjacent upper strip to reduce the maximum depth of the back piece.

2. A reflector advertising device for advertising matter arranged in rows of words, letters, characters or figures, comprising a plurality of strips angularly disposed relatively to one another and in planes which bring the vision points of all the strips to a common focus, a transparent diffusing element superimposed over the front of each reflecting strip to diffuse the light before and after leaving the reflecting surface and before reaching the eye.

3. A reflector advertising device for advertising matter comprising reflecting surfaces arranged in horizontal strips disposed angularly with respect to one another and in planes which have a common focus, and stippled glass superimposed over the front of the advertising matter with the smooth surface in close contact with the reflecting surfaces.

4. A reflector advertising device for advertising matter comprising reflecting surfaces arranged in horizontal strips disposed angularly with respect to one another and in planes which have a common focus, and a back piece upon which the strips are mounted, said piece being forwards from top to bottom.

5. A reflector advertising device comprising a plurality of glass strips a backing strip for each glass strip comprising a card faced with light absorbing material, a distance piece for said material to form a long pocket for retaining the advertising matter in position.

6. A reflector advertising device as claimed in claim 5, in which the back piece has attached to it a similar series of cards faced with light absorbing material the width of which is such that their lower edges will closely touch the upper edges of the backing strips attached to the glass.

7. A reflector advertising device as claimed in claim 5, including screw clips for the ends of said glass strips to fix the latter in position.

NORMAN BERNARD MACKENZIE O'BRIEN.